Sept. 28, 1926.  W. E. DEAN  1,601,161
TRIPLE VALVE DEVICE
Filed Oct. 15, 1924
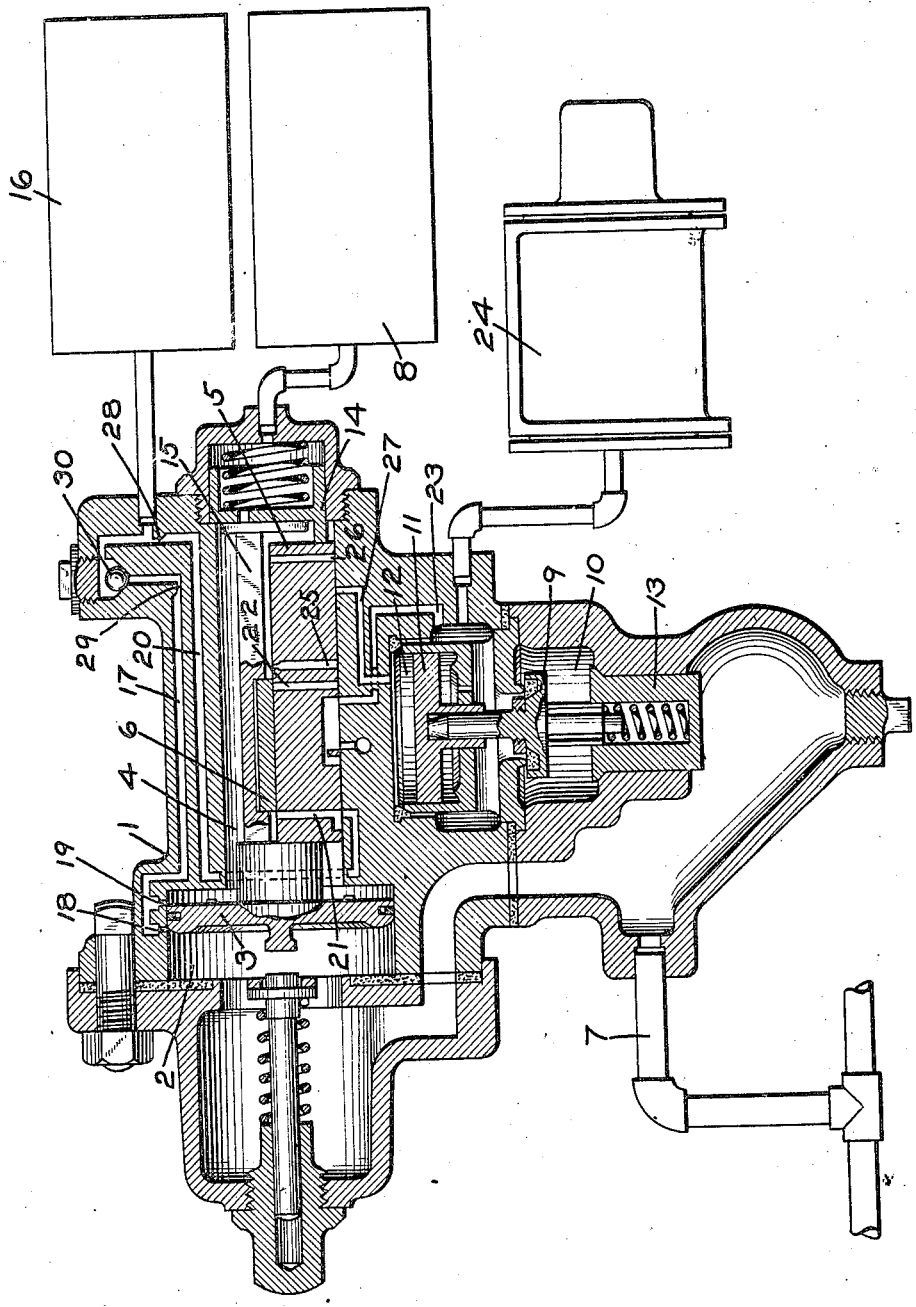
INVENTOR
WILLIAM E. DEAN
BY Wm. M. Cady
ATTORNEY Patented Sept. 28, 1926.

1,601,161

UNITED STATES PATENT OFFICE.

WILLIAM E. DEAN, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

TRIPLE VALVE DEVICE.

Application filed October 15, 1924. Serial No 743,708.

This invention relates to fluid pressure brakes, and more particularly to a triple valve device.

In addition to the usual auxiliary reservoir, a normally charged supplemental reservoir is sometimes employed in connection with a triple valve device, in order to provide an additional source of fluid under pressure for certain purposes, such as securing a high pressure in the brake cylinder in an emergency application of the brakes.

The principal object of my invention is to provide improved means for recharging the auxiliary reservoir and the supplemental reservoir, for reasons to be hereinafter specified.

In the accompanying drawing, the single figure is a sectional view of a triple valve device embodying my improvement.

According to my invention, certain characteristics of the retarded release triple valve device are utilized to secure the improved reservoir recharging feature, and consequently, a retarded release triple valve device is shown in the drawing comprising a casing 1 having a piston chamber 2, containing a piston 3 and a valve chamber 4 containing a main slide valve 5 and a graduating slide valve 6.

The piston chamber 2 is connected to the usual brake pipe 7 and valve chamber 4 is connected to the usual auxiliary reservoir 8. The triple valve casing may also contain a quick action valve mechanism comprising the usual brake pipe vent valve 9 contained in valve chamber 10 and emergency piston 11, contained in piston chamber 12 and adapted to operate the vent valve 9, communication between the brake pipe 7 and the valve chamber 10 being controlled by the usual check valve 13.

In order to secure the retarded release of the brakes, a yielding stop member 14 is provided, which acts on the stem 15 of the triple valve piston 3 and the main slide valve 5 and tends to maintain the moving parts of the triple valve device in the normal full release position.

A supplemental reservoir 16 is provided, and according to my invention, said supplemental reservoir is connected to a passage 17, which terminates in two ports 18 and 19, leading to the piston chamber 2 and disposed at opposite sides of the piston 3, so that communication is established from the brake pipe and the piston chamber 2 to the valve chamber 4 and the auxiliary reservoir 8, when the triple valve piston is in its full release position, and from the brake pipe to passage 17 and the supplemental reservoir in both full and retarded release positions. In the inner retarded release position, communication from the brake pipe to the auxiliary reservoir is cut off, since in this position, the piston 3 closes the port 19.

An additional passage 20 leads from the supplemental reservoir 16 to the seat of the main slide valve 5 and is adapted to register with a through port 21 in the slide valve 5 in both the full and the retarded release positions of the valve.

Assuming the reservoirs and the various chambers to be charged with fluid under pressure, when the brake pipe pressure is reduced to effect a service application of the brakes, the triple valve piston is moved out, first causing a relative movement of the graduating valve 6 to uncover the service port 22 and then a movement of the main valve, so that the service port 22 registers with passage 23, leading to the brake cylinder 24. Fluid under pressure is then supplied from the valve chamber 4 and the auxiliary reservoir 8 to the brake cylinder to effect a service application of the brakes in the usual manner.

Upon a sudden reduction in brake pipe pressure, the piston 3 is shifted to emergency position, in which the slide valve 5 is moved so as to cause the port 25 to register with brake cylinder port 23 and the port 26 to register with a passage 27 leading to the emergency piston chamber 12. Fluid under pressure is then supplied from the auxiliary reservoir to the brake cylinder and to the emergency piston 11, which piston is thereupon shifted, so as to open the valve 9 and thus prevent the venting of fluid from the brake pipe 7 to the brake cylinder, to effect an emergency application of the brakes.

Upon effecting an increase in brake pipe pressure to release the brakes, the triple valves at the head end of the train are shifted to the inner retarded release position, due to the more rapid increase in brake pipe pressure at the head end, and consequently, the port 19 of the triple valves at the head end of the train is closed and therefore fluid will not flow from the brake pipe to the auxiliary reservoir on the triple valves which have been shifted to the retarded release position. The brake pipe pressure not being reduced at the forward portion of the train by flow to the auxiliary reservoirs, will more rapidly increase the pressure in the brake pipe at the rear portion of the train, resulting in a more uniform release of the brakes throughout the train. On the other hand, when the triple valves throughout the train move either to the full or the inner retarded release positions, the passage 20 registers with port 21, so that fluid under pressure is suplied from the charged supplemental reservoir 16 to valve chamber 4 and the auxiliary reservoir 8. Thus the recharging of the auxiliary reservoirs throughout the train is assisted by the flow of fluid from the supplemental reservoirs, resulting in a more uniform recharging of the auxiliary reservoirs and assuring a better control of the train, especially when operating on descending grades where frequent brake applications may be required.

When the brake pipe pressure at the forward end of the train settles down, the triple valves will be moved from retarded to full release position, so that at the head end of the train, as well as at the rear, the final recharging of the auxiliary reservoirs is completed by flow from the brake pipe 7 around the triple valve piston 3, by way of the ports 18 and 19. At the same time the supplemental reservoir is recharged from the brake pipe by way of the passage 17.

The passage 20 is provided with a restricted portion 28, so as to prevent such a rate of increase in auxiliary reservoir pressure by flow from the supplemental reservoir as would cause possible premature movement of the triple valve parts to full release position and a consequent too rapid release of the brakes.

The passage 17 is also provided with a restricted portion 29 to prevent a too rapid flow of fluid from the brake pipe to the supplemental reservoir. A check valve 30 is interposed in passage 17 to prevent flow of fluid from the supplemental reservoir 16 to the brake pipe 7 when the triple valve piston 3 is in either full or retarded release position and in case the brake pipe pressure should be lower than that in the supplemental reservoir.

Having now described my invention, what I claim as new and desire to secure by Letters Patent, is:—

1. In a fluid pressure brake, the combination with a brake pipe, auxiliary reservoir, and a supplemental reservoir, of a triple valve device controlling ports through which fluid under pressure is supplied from the brake pipe to the auxiliary reservoir and from the supplemental reservoir to the auxiliary reservoir, said triple valve device being operated upon an increase in brake pipe pressure for temporarily closing communication through which fluid is supplied from the brake pipe to the auxiliary reservoir.

2. In a fluid pressure brake, the combination with a brake pipe, an auxiliary reservoir, and a supplemental reservoir, of a triple valve device having a normal position in which communication is open from the brake pipe to the auxiliary reservoir and an inner position in which communication between the brake pipe and the auxiliary reservoir is closed and in which communication is open for supplying fluid from the supplemental reservoir to the auxiliary reservoir.

3. In a fluid pressure brake, the combination with a brake pipe, an auxiliary reservoir, and a supplemental reservoir, of a triple valve device having a normal position in which communication is open from the brake pipe to the auxiliary reservoir and an inner position in which communication between the brake pipe and the auxiliary reservoir is closed in which communication is open for supplying fluid from the supplemental reservoir to the auxiliary reservoir, and a yielding resistance means for returning said triple valve from its inner position to its normal position.

4. In a fluid pressure brake, the combination with a brake pipe, an auxiliary reservoir, and a supplemental reservoir, of a triple valve device having a piston and a slide valve operated by said piston upon an increase in brake pipe pressure for opening communication from the supplemental reservoir to the auxiliary reservoir, the movement of said piston operating to close communication from the brake pipe to the auxiliary reservoir.

5. In a fluid pressure brake, the combination with a brake pipe, an auxiliary reservoir, and a supplemental reservoir, of a triple valve device having a piston and a slide valve operated by said piston upon an increase in brake pipe pressure for opening communication from the supplemental reservoir to the auxiliary reservoir, the movement of said piston operating to close communication from the brake pipe to the auxiliary reservoir, and a yielding resistance means for moving said piston so as to open communication from the brake pipe to the auxiliary reservoir.

6. In a fluid pressure brake, the combination with a brake pipe and auxiliary reservoir, of a triple valve device having a piston chamber open to the brake pipe and containing a piston and a valve chamber open to the auxiliary reservoir and containing a valve operable by said piston, said triple valve device having a passage terminating in two ports opening into the piston chamber at opposite sides of the piston when said piston is in an intermediate position, one of said ports being closed by said piston upon movement to an inner position.

7. In a fluid pressure brake, the combination with a brake pipe, auxiliary reservoir, brake cylinder, and a supplemental reservoir, of a triple valve device comprising a piston subject to the opposing pressures of the brake pipe and auxiliary reservoir, a slide valve operated by said piston and having a full release position and an inner position in which the release of fluid from the brake cylinder is restricted, and a yielding resistance means for opposing movement of said piston and slide valve from full release position to the restricted release position, said piston being adapted to open ports for supplying fluid from the brake pipe to the auxiliary reservoir in full release position and to close communication from the brake pipe to the auxiliary reservoir in restricted release position, and said slide valve being adapted to open communication from the supplemental reservoir to the auxiliary reservoir in both release positions.

8. In a fluid pressure brake, the combination with a brake pipe, auxiliary reservoir, brake cylinder, and a supplemental reservoir, of a triple valve device comprising a piston subject to the opposing pressures of the brake pipe and auxiliary reservoir, a slide valve operated by said piston and having a full release position and an inner position in which the release of fluid from the brake cylinder is restricted, and a yielding resistance means for opposing movement of said piston and slide valve from full release position to the restricted release position, said piston being adapted to open ports for supplying fluid from the brake pipe to the auxiliary reservoir in full release position and to close communication from the brake pipe to the auxiliary reservoir in restricted release position, and to establish communication from the brake pipe to the supplemental reservoir in both positions, and said slide valve being adapted to open communication from the supplemental reservoir to the auxiliary reservoir in both release positions.

In testimony whereof I have hereunto set my hand.

WILLIAM E. DEAN.